US012756246B2

(12) United States Patent
Oyama et al.

(10) Patent No.: US 12,756,246 B2
(45) Date of Patent: Oct. 6, 2026

(54) CRYSTALLINE RADICAL POLYMERIZABLE COMPOSITION FOR FIXING A MAGNET OF A ROTATING ELECTRIC MACHINE ROTOR CORE, A ROTATING ELECTRIC MACHINE ROTOR CORE USING THE COMPOSITION, AND A METHOD OF MANUFACTURING THE ROTATING ELECTRIC MACHINE ROTOR CORE

(71) Applicants: Mitsubishi Gas Chemical Next Company, Inc., Tokyo (JP); AISIN CORPORATION, Kariya-city (JP); TOYOBO MC Corporation, Osaka (JP)

(72) Inventors: Tomohito Oyama, Tokyo (JP); Yuichi Ozawa, Hiratsuka-city (JP); Ryo Ueta, Hiratsuka-city (JP); Yusaku Sakuraba, Hiratsuka-city (JP); Motoki Kori, Kariya-city (JP); Toshiyuki Saburi, Kariya-city (JP); Masahito Tanigawa, Osaka (JP); Daiki Funaoka, Osaka (JP)

(73) Assignees: MITSUBISHI GAS CHEMICAL NEXT COMPANY, INC., Tokyo (JP); AISIN CORPORATION, Kariya-City (JP); TOYOBO MC CORPORATION, Osaka (JP)

( * ) Notice: Subject to any disclaimer, the term of this patent is extended or adjusted under 35 U.S.C. 154(b) by 733 days.

(21) Appl. No.: 17/909,852

(22) PCT Filed: Mar. 29, 2021

(86) PCT No.: PCT/JP2021/013270
§ 371 (c)(1),
(2) Date: Sep. 7, 2022

(87) PCT Pub. No.: WO2021/200817
PCT Pub. Date: Oct. 7, 2021

(65) Prior Publication Data

US 2023/0082542 A1 Mar. 16, 2023

(30) Foreign Application Priority Data

Mar. 31, 2020 (JP) ................................ 2020-061983

(51) Int. Cl.
*H02K 1/04* (2006.01)
*C08F 20/36* (2006.01)
(Continued)

(52) U.S. Cl.
CPC ............... *H02K 1/04* (2013.01); *C08F 20/36* (2013.01); *C08F 20/68* (2013.01); *C08K 3/22* (2013.01);
(Continued)

(58) Field of Classification Search
None
See application file for complete search history.

(56) References Cited

U.S. PATENT DOCUMENTS 11,485,801 B2 * 11/2022 Ozawa .................. B29C 43/006
2014/0327329 A1 11/2014 Kitada
(Continued)

FOREIGN PATENT DOCUMENTS

EP 3590973 A1 * 1/2020 ........... B29C 43/003
JP 2016-197995 A 11/2016
(Continued)

OTHER PUBLICATIONS

Extended European Search Report for European Application No. 21780466.5, dated Mar. 19, 2024.

*Primary Examiner* — Sanza L. McClendon
(74) *Attorney, Agent, or Firm* — Birch, Stewart, Kolasch & Birch, LLP

(57) ABSTRACT

An object of the present invention is to provide a crystalline radically polymerizable composition for fixing a magnet of
(Continued)

a rotating electric machine rotor core, which is excellent in handleability around room temperature, excellent in fluidity from the injection step to the curing step, and excellent in strength of the cured product.

A crystalline radical polymerizable composition for fixing a magnet of a rotating electric machine rotor core of the present invention is characterized by fixing the magnet inserted in a magnet accommodating portion provided in a rotor core of a rotating electric machine formed of a laminated steel sheet and the laminated steel sheet, wherein the crystalline radical polymerizable composition contains at least a crystalline radical polymerizable compound A, an inorganic filler B, a silane coupling agent C, and a radical polymerization initiator D, wherein the crystalline radical polymerizable compound A is solid at 23° C. and has the property capable of imparting fluidity by heating, wherein the inorganic filler B is contained in an amount of 50 to 90% by mass based on the total amount of the crystalline radical polymerizable composition, and the melt viscosity of the crystalline radical polymerization measured by an enhanced flow tester is 500 Pa·s or more at 90° C. and a shear velocity of 1/s.

6 Claims, 2 Drawing Sheets

(51) Int. Cl.

| | |
|---|---|
| ***C08F 20/68*** | (2006.01) |
| ***C08K 3/22*** | (2006.01) |
| ***C08K 3/36*** | (2006.01) |
| ***C08K 5/54*** | (2006.01) |
| ***H02K 1/276*** | (2022.01) |
| ***H02K 1/28*** | (2006.01) |
| ***H02K 15/03*** | (2006.01) |
| ***H02K 15/12*** | (2006.01) |

(52) U.S. Cl.

CPC .............. *C08K 3/36* (2013.01); *C08K 5/5403* (2013.01); *H02K 1/276* (2013.01); *H02K 1/28* (2013.01); *H02K 15/03* (2013.01); *H02K 15/12* (2013.01); *C08K 2003/222* (2013.01)

(56) References Cited

U.S. PATENT DOCUMENTS

| | | | |
|---|---|---|---|
| 2019/0372440 | A1 | 12/2019 | Ushida et al. |
| 2020/0231714 | A1 | 7/2020 | Ozawa et al. |
| 2021/0171813 | A1 | 6/2021 | Kaneko |

FOREIGN PATENT DOCUMENTS

| | | | |
|---|---|---|---|
| JP | 2017-186439 | A | 10/2017 |
| WO | WO 2018/159387 | A1 | 9/2018 |
| WO | WO 2018/164277 | A1 | 9/2018 |
| WO | WO 2019/123885 | A1 | 6/2019 |

* cited by examiner

[Figure 1]
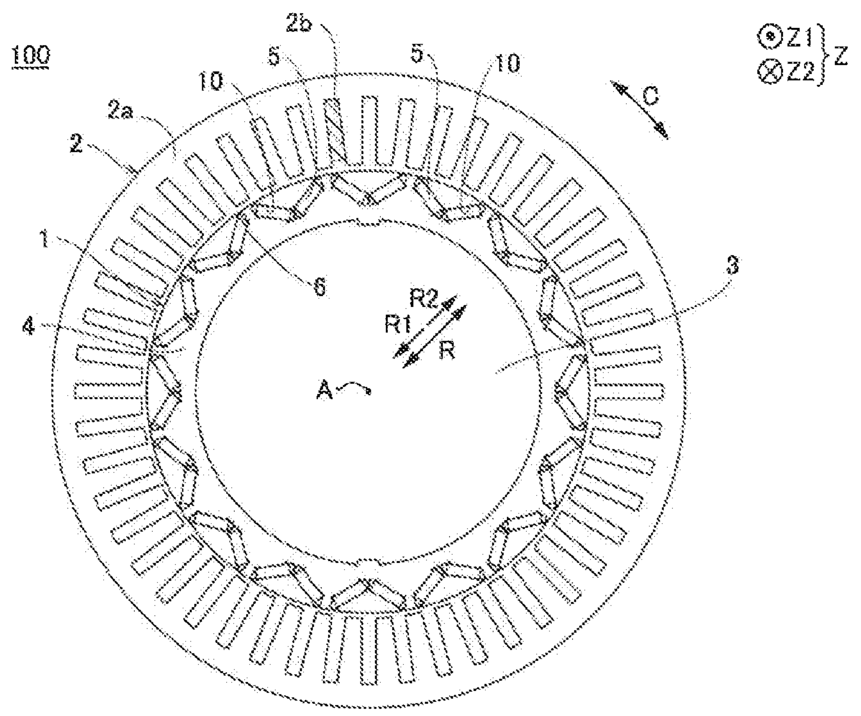
[Figure 2]
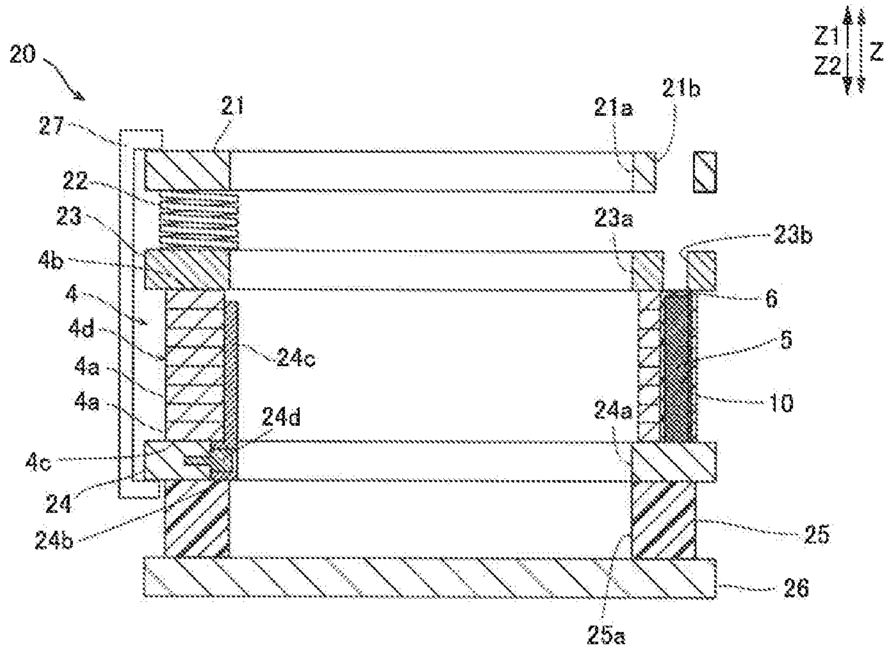

[Figure 3]
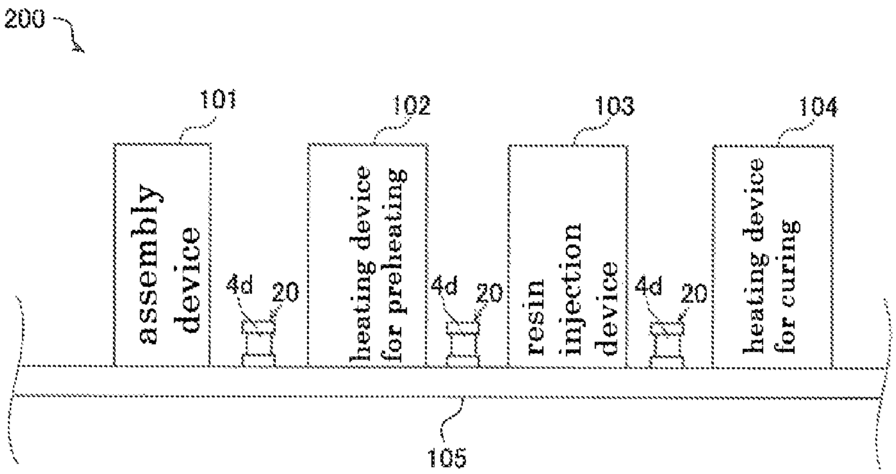

CRYSTALLINE RADICAL POLYMERIZABLE COMPOSITION FOR FIXING A MAGNET OF A ROTATING ELECTRIC MACHINE ROTOR CORE, A ROTATING ELECTRIC MACHINE ROTOR CORE USING THE COMPOSITION, AND A METHOD OF MANUFACTURING THE ROTATING ELECTRIC MACHINE ROTOR CORE

TECHNICAL FIELD

The present invention relates to a crystalline radical polymerizable composition for fixing a magnet of a rotating electric machine rotor core, a rotating electric machine rotor core using the composition, and a method for manufacturing the rotating electric machine rotor core.

BACKGROUND ART

In order to reduce the burden on the global environment, electrified vehicles with good energy efficiency are being actively developed. Electrified vehicles include EVs that do not use gasoline and are powered only by electricity, HVEs that run on electricity only, but switch to gasoline running when electric power runs out, mild HVEs on gasoline vehicles with auxiliary motors for starting, and FCVs that run on the electric power generated by the chemical reaction of hydrogen and oxygen and the like have been developed. The important component for electrification are motors that generate mechanical energy, batteries that are the source of electrical energy, and semiconductors that control them. Since electrified vehicles are required to have an extended cruising range, active research is being conducted on each component. The motor mainly consists of a rotor, a bearing, a stator, a bracket, and a lead wire. The parts that make up a motor are an electric wire that conducts electricity, an iron core that is a passage for magnetic flux, an insulating material (body) that blocks current from flowing outside a predetermined location, and a permanent magnet that is a source of magnetic field. The motor generates mechanical energy by using attraction and repulsion power between the magnetic field generated by passing electricity through the stator and the magnetic field of the permanent magnet fixed to the rotor. Permanent magnets are used by being fixed to a rotor, and various methods for fixing have been proposed. Recently, the demand of epoxy resin molding materials for fixing rotor core magnets, which are thermosetting resins with good filling properties and reliability, is increasing.

The epoxy resin molding material for fixing the rotor core magnet is tablet-shaped, used in the transfer molding method with high productivity, and has excellent physical properties such as adhesion and linear expansion rate, so high reliability has been established. However, since freezing storage and post-curing step required, simplification of the engineering process is required.

PRIOR ART LITERATURE

Patent Literature

Patent literature 1: JP-A1-2016-197995

SUMMARY OF INVENTION

Problems to be Resolved by the Invention

In Patent literature 1, a rotor made of a resin composition for fixing with excellent filling property in a gap between a hole portion and a magnet is proposed. Although it is described that the filling property of the resin composition for fixing i.e. the filling property and the heat dissipation property improves by defining the range of the ratio between the maximum particle size of the inorganic filler and the gap between the hole portion and the magnet, in the examples, only qualitative effects are shown in both filling characteristics and heat dissipation, and it is unclear in terms of quantitative judgment of measurement and evaluation.

Generally, the epoxy resin composition used for transfer molding undergoes the reaction between the epoxy resin and the curing agent at room temperature, so that it must be stored frozen, and a step of returning the stored frozen resin composition to room temperature at the time of use is required. In addition, since it does not completely cure during the molding time, there is a problem in terms of production efficiency, such as performing post-curing for several hours after molding because it is necessary to obtain sufficient molded product characteristics.

Therefore, an object of the present invention is to provide a crystalline radical polymerizable composition for fixing a magnet of a rotating electric machine rotor core, which is excellent in handleability and flow characteristics at around room temperature.

Means of Solving the Problems

As a result of various studies on a composition containing at least a crystalline radical polymerizable compound A and an inorganic filler B from various viewpoints, the present inventor has found a crystalline radical polymerization composition for fixing a magnet in the rotor core of the rotating electric machine of the present invention.

That is, a crystalline radical polymerizable composition for fixing a magnet of a rotating electric machine rotor core of the present invention is characterized by fixing the magnet inserted in a magnet accommodating portion provided in a rotor core of a rotating electric machine formed of a laminated steel sheet and the laminated steel sheet,

- wherein the crystalline radical polymerizable composition contains at least a crystalline radical polymerizable compound A, an inorganic filler B, a silane coupling agent C, and a radical polymerization initiator D,
- wherein the crystalline radical polymerizable compound A is solid at 23° C. and has the property capable of imparting fluidity by heating,
- wherein the inorganic filler B is contained in an amount of 50 to 90% by mass based on the total amount of the crystalline radical polymerizable composition, and the melt viscosity of the crystalline radical polymerization measured by an enhanced flow tester is 500 Pa·s or more at 90° C. and a shear velocity of 1/s.

Further, in a preferred embodiment of the crystalline radical polymerizable composition for fixing a magnet of a rotating electric machine rotor core of the present invention, it is characterized in that the melt viscosity of the crystalline radical polymerizable composition measured by the enhanced flow tester is 100 Pa·s or less at 90° C. and a shear velocity of 250/s.

Further, in a preferred embodiment of the crystalline radical polymerizable composition for fixing a magnet of a rotating electric machine rotor core of the present invention, it is characterized in that the quotient (A)/(B) of the melt viscosity of the crystalline radical polymerizable composition measured by the enhanced flow tester is in the range of 10 to 100.

(A) Melt viscosity at shear velocity 1/s (B) Melt viscosity at a shear velocity of 250/s Further, in a preferred embodiment of the crystalline radical polymerizable composition for fixing a magnet of a rotating electric machine rotor core of the present invention, it is characterized in that the inorganic filler B contains at least amorphous spherical silica.

Further, in a preferred embodiment of the crystalline radical polymerizable composition for fixing a magnet of a rotating electric machine rotor core of the present invention, it is characterized in that the content of the amorphous spherical silica is 50 to 100% by mass with respect to the inorganic filler B.

Further, in a preferred embodiment of the crystalline radical polymerizable composition for fixing a magnet of a rotating electric machine rotor core of the present invention, it is characterized in that the crystalline radical polymerizable composition contains a lubricant E.

Further, the rotating electric machine rotor core of the present invention is characterized in that a magnet is fixed by using the crystalline radical polymerizable composition for fixing magnet of a rotating electric machine rotor core of the present invention.

Further, the method of manufacturing a rotating electric machine rotor core of the present invention is characterized by having a step of injecting a crystalline radical polymerizable composition having fluidity imparted by heating into a magnet accommodating portion provided in a rotating electric machine rotor core formed of a laminated steel plate, wherein the crystalline radical polymerizable composition for fixing a rotating electric rotor core magnet of the present invention is used, and the injection process is by an injection molding method, a transfer molding method, or an insert molding method by a casting method.

Effect of Invention

The crystalline radical polymerizable composition for fixing magnets of the rotating electric machine rotor core of the present invention has the effects of being excellent in handleability at around room temperature and excellent in flow characteristics from the injection process to the curing process. Further, since the material has excellent strength and good filling property, it can contribute to the production of a high-performance rotating electric machine rotor core.

In addition, the term "fixing" means that it prevents an object from moving from where it is, or that an object does not move from there. Fixing includes bonding and sealing and the like. Fixing applications include adhesive applications and sealing applications etc. Fixing using the present crystalline radical polymerizable composition for fixing electrical and electronic parts can fix a part and/or a whole of the device and/or the parts to be fixed.

BRIEF DESCRIPTION OF THE DRAWINGS

FIG. 1 It is a plan view which shows the structure of the rotor (rotating electric machine) in an example to which the composition of this invention can be applied.

FIG. 2 It is sectional drawing which shows the jig which presses a laminated core in the example of the case where the composition of this invention is applied, and the rotor core after completion arranged in the jig.

FIG. 3 It is a schematic diagram which shows the structure of the manufacturing system of a rotor core in an example of the case where the composition of this invention is applied

MODE FOR CARRYING OUT THE INVENTION

A crystalline radical polymerizable composition for fixing a magnet of a rotating electric machine rotor core of the present invention is characterized by fixing the magnet inserted in a magnet accommodating portion provided in a rotor core of a rotating electric machine formed of a laminated steel plate and the laminated steel plate, wherein the crystalline radical polymerizable composition contains at least a crystalline radical polymerizable compound A, an inorganic filler B, a silane coupling agent C, and a radical polymerization initiator D, wherein the crystalline radical polymerizable compound A is solid at 23° C. and has the property capable of imparting fluidity by heating, wherein the inorganic filler B is contained in an amount of 50 to 90% by mass based on the total amount of the crystalline radical polymerizable composition, and the melt viscosity of the crystalline radical polymerization measured by an enhanced flow tester is 500 Pa·s or more at 90° C. and a shear velocity of 1/s. This is because the use of the crystalline radical polymerizable composition makes it possible to realize a polymerizable composition having excellent flow characteristics and handleability, as shown in Examples described later.

In the present invention, the crystalline radical polymerizable compound A may include one or more selected from crystalline unsaturated polyester, crystalline epoxy (meth) acrylate, crystalline urethane (meth) acrylate, crystalline polyester (meth) acrylate, and crystalline polyether (meth) acrylate and the like. By using these crystalline radical polymerizable compounds A, the handleability of the crystalline radical polymerizable composition of the present invention at around room temperature is improved. In addition, the mechanical properties of the cured product of the crystalline radical polymerizable composition of the present invention are also improved. These compounds are preferably crystalline compounds. Further, these compounds need to be compounds having a property capable of imparting fluidity by heating.

In the present specification, the crystalline compound is a compound having a melting point, and may be a compound having a glass transition point and a melting point. These temperatures can be confirmed by thermal analyzers such as DSC (Differential Scanning calorimeter) and TGDTA (Differential Thermal Weight Simultaneous Measuring Device).

In a preferred embodiment of the crystalline radical polymerizable composition for fixing a magnet of the rotating electric machine rotor core of the present invention, the melting point of the crystalline radical polymerizable compound A is preferably 30° C. or higher, more preferably 40° C. or higher, even more preferably 50° C. or higher and the melting point of the crystalline radical polymerizable compound A is preferably 150° C. or lower, more preferably 140° C. or lower, and even more preferably 130° C. or lower. This is because better handleability can be realized by using the crystalline radical polymerizable compound A having a melting point in the range of 30 to 150° C., as compared with the case of using a crystalline radical polymerizable compound having a melting point of less than 30° C. or a crystalline radical polymerizable compound having a melting point higher than 150° C. When the melting point of the crystalline radical polymerizable compound A is lower than the above-mentioned range, it tends to become a liquid at room temperature, so that it may be difficult for the crystalline radical polymerizable composition to maintain a solid state. When the melting point of the crystalline radical polymerizable compound A is higher than the above-mentioned range, the curing temperature and the plasticizing temperature described later are close to each other, so that there is a risk of thickening during melt storage during injection. Since the viscosity of the crystalline radical polymerizable composition containing the crystalline radical polymerizable compound A sharply decreases at a temperature equal to or higher than the melting point of the crystalline radical polymerizable compound A, a composition having a low melt viscosity can be obtained. On the other hand, since the amorphous radical polymerizable composition containing no crystalline radical polymerizable compound has no melting point, the viscosity gradually decreases as the temperature of the composition rises. Since the temperature may be raised to a temperature higher than necessary in order to lower the viscosity of the amorphous radical polymerizable composition to a desired viscosity, as described above, the curing temperature and the plasticizing temperature are close to each other, which may reduce the manufacturing stability.

When only a crystalline radical polymerizable compound having a melting point of less than 30° C. is used, it tends to be difficult to obtain a solid crystalline radical polymerizable composition at 23° C. However, blending a crystalline radical polymerizable compound having a melting point of less than 30° C. as a part of the crystalline radical polymerizable compound A of the present invention is not excluded as long as the object of the present invention is not impaired. Further, in the case that only a crystalline radical polymerizable compound having a melting point higher than 150° C. is used, in the injection molding method, the plasticization temperature and the curing temperature are close to each other when the crystalline radical polymerizable composition is plasticized in the cylinder, so that the curing reaction tends to progress partially in the cylinder and the stability tends to become poor. However, blending a crystalline radical polymerizable compound having a melting point of more than 150° C. as a part of the crystalline radical polymerizable compound A of the present invention is not excluded as long as the object of the present invention is not impaired.

In the present invention, the crystalline radical polymerizable composition is preferably solid at 23° C. and more preferably solid at 35° C. from the viewpoint of handleability. The above-mentioned range is set so that the shape of the composition does not change under the manufacturing, molding, transportation, and storage environment of the crystalline radical polymerizable composition, so that continuous production is possible under general-purpose manufacturing equipment and conditions. This is also because it is easy to transport and store. Moreover, in the present invention, the term "solid" refers to a solid whose shape and volume do not easily change due to an external force, and it is preferable that the measured value of hardness described in the section of Examples of the present specification is 5 or more.

In the present invention, as the inorganic filler B, one having an average particle diameter of 100 μm or less, preferably 0.01 to 50 μm, can be used. By using the inorganic filler having the above average-mentioned particle size, it is possible to obtain a crystalline radical polymerizable composition for fixing a magnet of a rotating electric machine rotor core having excellent fluidity at the time of injection and strength of a cured product. Further, the content of the inorganic filler B is preferably 50% by mass or more, more preferably 55% by mass or more, and even more preferably 60% by mass or more, based on the total amount of the crystalline radical polymerizable composition. Further, it is more preferably 90% by mass or less. The above-mentioned range is set because there is a possibility that the crystalline radical polymerizable composition of the present invention filled in the magnet accommodating portion of the rotating electric machine rotor core may flow out to the outside of the magnet accommodating portion and may cause an adverse effect on product quality such as poor fixing of the magnet during the injection step, the transition period from the injection step to the curing step, and/or the curing step. When the amount of the inorganic filler B is smaller than the above-mentioned range. On the other hand, if the amount exceeds the above-mentioned range, the above-mentioned range is set because there is a possibility that the melt viscosity becomes high when the crystalline radical polymerizable composition of the present invention is injected into the magnet accommodating portion, so that a load is applied to the rotating electric machine rotor core, which may cause deformation or damage to the rotating electric machine rotor core.

Further, in a preferred embodiment of the crystalline radical polymerizable composition for fixing a magnet of a rotating electric machine rotor core of the present invention, the inorganic filler B preferably contains the amorphous spherical silica from the viewpoint of mechanical strength of the cured product and fluidity at the time of injection. The content of the amorphous spherical silica is preferably 50% by mass or more, more preferably 55% by mass or more, still more preferably 60% by mass or more, based on the total amount of the inorganic filler B.

The melt viscosity of the crystalline radical polymerizable composition of the present invention measured by an enhanced flow tester is preferably 500 Pa·s or more, more preferably 700 Pa·s or more at 90° C. and a shear velocity of 1/s. The above-mentioned range is set so that the crystalline radical polymerizable composition of the present invention does not permeate into the gaps between the electromagnetic steel sheets laminated to form a rotor core in the filling step and/or the transition step from the injection step to the curing step and/or the curing step. Further, since the composition has a shape-retaining property even in the transfer process to the curing process, it does not drip and can have good product quality.

The ratio of the crystalline radical polymerizable compound A to the total amount of the crystalline and amorphous radical polymerizable compounds is preferably 30% by mass or more, more preferably 35% by mass or more, and still more preferably 40% by mass or more. The above-mentioned range is set because there is a possibility that the crystalline radical polymerizable composition of the present invention becomes a paste or clay at around room temperature and may be inferior in handleability, when the ratio of the crystalline radical polymerizable compound A is smaller than the above-mentioned range.

Further, in a preferred embodiment of the crystalline radical polymerizable composition for fixing a magnet of the rotating electric machine rotor core of the present invention, the weight average molecular weight of the crystalline radical polymerizable compound A is preferably 100,000 or less, more preferably 50,000 or less, and even more preferably 30,000 or less, from the viewpoint of quality control of the crystalline radical polymerizable composition. The above-mentioned range is set because there is a possibility that the molecular weight of the crystalline radical polymerizable composition cannot be controlled with high accuracy when the weight average molecular weight is larger than the above-mentioned range, so that the compound characteristics and the composition characteristics may fluctuate.

Further, in a preferred embodiment of the crystalline radical polymerizable composition for fixing a magnet of the rotating electric machine rotor core of the present invention, from the viewpoint of facilitating the injection step of the crystalline radical polymerizable composition of the present invention, the melt viscosity of the crystalline radical polymerizable composition measured by the enhanced flow tester is preferably 100 Pa·s or less, more preferably 75 Pa·s or less at 90° C. and the shear velocity of 250/s. The above-mentioned range is set so that the rotor core may be deformed when the injection pressure of the crystalline radical polymerizable composition is increased.

Further, in a preferred embodiment of the crystalline radical polymerizable composition for fixing a magnet of the rotating electric machine rotor core of the present invention, from the viewpoint of the balance of fluidity, it is characterized in that the quotient (A)/(B) of the melt viscosity of the crystalline radical polymerizable composition measured by the enhanced flow tester is in the range of 10 to 100. By setting the above-mentioned range, continuous production is possible without the need to provide a cooling process at the time of the production of the rotor core, and fluidity at the time of injecting the magnet accommodating portion of the rotor core can be ensured.

(A) Melt viscosity at shear velocity 1/s (B) Melt viscosity at a shear velocity of 250/s Further, in a preferred embodiment of the crystalline radical polymerizable composition for fixing a magnet of a rotating electric rotor core of the present invention, from the viewpoint of reliability of the crystalline radical polymerizable composition to both the magnet and the magnet accommodating portion, it is characterized in that the crystalline radical polymerizable composition contains a lubricant E. The contents of the lubricant E can be preferably 0.1 to 5% by mass, more preferably 0.3 to 3% by mass, based on the total amount of the crystalline radical polymerizable composition. Within the above-mentioned range, the crystalline radical polymerizable composition is imparted with slipperiness, and the crystalline radical polymerizable composition is easily filled in the gap between the magnet and the magnet accommodating portion of the rotating electric machine rotor core, so that the magnet fixing force is improved and the reliability may increase.

Further, the shape of the granules of the crystalline radical polymerizable composition for fixing magnets of the rotating electric machine rotor core of the present invention is not particularly limited, but it is preferably granular, powdery, tablet-like, or a mixture consisting of one or more of them.

Further, the rotating electric machine rotor core of the present invention is characterized in that a magnet is fixed by using the crystalline radical polymerizable composition for fixing the magnet of the rotating electric machine rotor core of the present invention. The fixing method is not particularly limited by a conventional method, and is not particularly limited as long as the crystalline radical polymerizable composition for fixing the magnet of the rotating electric rotor core of the present invention is used.

As to the method for manufacturing a rotating electric machine rotor core of the present invention, the rotor core is produced through a step of injecting the crystalline radical polymerizable composition of the present invention, which has been imparted with fluidity by heating, into the magnet accommodating portion provided in the rotating electric rotor core made of a laminated steel plate. The injection is preferably performed by an injection molding method, a transfer molding method, or an insert molding method by a casting method. Moreover, as described above, the method of fixing the magnet of the rotor core with the resin is not particularly limited by the conventional method. In general, various known core pressing means and resin injecting means can be applied. For example, as the core pressing means, mention may be made of a pressing with a mold of a resin injection device and a pressing with a jig. Further, as the resin injection means, mention may be made of a transfer molding machine, an injection molding machine and the like. Further, a core pressing method and various resin injection devices may be combined and manufactured by a conventional method. In the examples described later, the jig pressing means and the injection molding machine are used in combination, but the present invention is not limited to this. For example, as a combination, mention may be made of a combination of a mold pressing means and a transfer molding machine, a combination of a jig pressing means and a transfer molding machine, or a combination of a mold pressing means and an injection molding machine, etc., by a conventional method, it is possible to fix the magnet of the rotor core by using the composition of the present invention.

<A Method of Manufacturing a Crystalline Unsaturated Polyester>

The unsaturated polyester used in the present invention can be obtained, for example, by reacting with an unsaturated polybasic acid, a saturated polybasic acid and glycols according to a known dehydration condensation reaction. Generally, it can have an acid value of 2-40 mg-KOH/g. In the production of unsaturated polyester, by appropriately selecting and combining the acid components of unsaturated polybasic acid and saturated polybasic acid, or selecting and combining glycols, or selecting the blending ratio thereof and the like, an unsaturated polyester having a crystallinity and having a characteristic that is solid at 23° C. and can be imparted with fluidity by heating can be obtained.

As unsaturated polybasic acids, mention may be made of maleic acid, maleic anhydride, fumaric acid, citraconic acid, mesaconic acid, itaconic acid, tetrahydrophthalic acid, glutaconic acid and the like.

As saturated polybasic acids, mention may be made of phthalic acid, phthalic anhydride, isophthalic acid, terephthalic acid, succinic acid, adipic acid, sebatic acid, azelaic acid, tetrahydrophthalic anhydride, methyltetrahydrophthalic anhydride, endomethylenetetrahydrophthalic anhydride, hetic acid, tetrabrom phthalic anhydride and the like.

As glycols, mention may be made of ethylene glycol, 1,3-propanediol, 1,4-butanediol, 1,5-pentanediol, 1,6-hexanediol, 1,8-octanediol, propylene glycol, diethylene glycol, triethylene glycol, dipropylene glycol, neopentyl glycol, 1,3-butanediol, hydride bisphenol A, bisphenol A propylene oxide compound, cyclohexanedimethanol, dibrom neopentyl glycol and the like.

In the present invention, among the crystalline unsaturated polyesters, it is preferable to use fumaric acid as the unsaturated polybasic acid, isophthalic acid or terephthalic acid as the saturated polybasic acid, and as glycols, it is preferable to use the unsaturated polyester using ethylene glycol, 1,3-saturated polyester using propanediol, 1,4-butanediol, 1,5-pentanediol, 1,6-hexanediol, 1,8-octanediol and cyclohexanedimethanol as the main component.

<A Method of Manufacturing a Crystalline epoxy (meth) acrylate>

The epoxy (meth) acrylate used in the present invention can be produced by a method known in itself. It can be obtained by reacting an epoxy resin with an unsaturated monobasic acid in the presence or absence of a known polymerization inhibitor and a known esterification catalyst, in an inert gas stream or in an air atmosphere. By appropriately selecting an epoxy resin and an unsaturated monobasic acid, an epoxy (meth) epoxy acrylate having a crystallinity and having a characteristic that is solid at 23° C. and can be imparted with fluidity by heating can be obtained. If necessary, another radical polymerizable compound or an organic solvent can be added to react for the purpose of lowering the melt viscosity of the reaction system.

As the epoxy (meth) acrylate in the present invention, for example, mention may be made of an epoxy (meth) acrylate having a double bond of acrylate or methacrylate at the molecular terminal obtained by addition-reacting acrylic acid or methacrylic acid to an epoxy resin having two or more glycidyl ether groups in one molecule. An epoxy (meth) acrylate resin in which an epoxy (meth) acrylate is dissolved in a radical polymerizable compound may be used. As the epoxy resin having two or more glycidyl ether groups in one molecule, for example, mention may be made of epoxy resins such as bisphenol type epoxy resins from bisphenol A, bisphenol F, bisphenol S, etc., or derivatives thereof, bixylenol type epoxy resin from bixylenol and its derivatives, biphenol type epoxy resins from biphenols and derivatives thereof, naphthalene type epoxy resins from naphthalene and its derivatives, and novolak type epoxy resins, which may be used by itself or by the combination of two or more thereof. The epoxy equivalent, which is a measure of the molecular weight of the epoxy resin, is preferably 174 to 2,000 eq/g.

<A Method of Manufacturing a Crystalline urethane (meth) acrylate>

Urethane (meta) acrylate in the present invention, as an example, can be a urethane acrylate having a double bond of acrylate or methacrylate at the end of molecule obtained by reacting polyalcohol and/or polyester polyol and/or polyether polyol having two or more of hydroxyl groups in one molecule with diisocyanate to add isocyanate groups at the end of molecule and/or one or more of isocyanate groups in one molecule to react these isocyanate groups with a compound having an alcoholic hydroxyl group and one or more of acrylate groups or methacrylate groups, or by reacting a compound having an alcoholic hydroxyl group and one or more of acrylate groups or methacrylate groups with isocyanate firstly so as to maintain isocyanate group, and then by reacting a remaining isocyanate groups with polyalcohol and/or polyester polyol and/or polyether polyol having two or more of hydroxyl groups in one molecule. In the production of urethane (meth) acrylate, it is possible to obtain a urethane (meth) epoxy acrylate which has crystallinity, by appropriately selecting a combination of isocyanate, polyalcohol and/or polyester polyol and/or polyether polyol, and a compound having alcoholic hydroxyl group and one or more acrylate group or methacrylate group. A urethane (meth) acrylate resin in which urethane acrylate or urethane methacrylate is blended with a radical polymerizable compound such as styrene or diethylene glycol dimethacrylate may be used. These may be used by itself or by the combination of two or more thereof. By appropriately adjusting the constituent components of these compounds, they can be given the property of being solid at 23° C. and imparting fluidity by heating.

As the compounds having an alcoholic hydroxyl group and one or more acrylate groups or methacrylate groups, it is possible to use hydroxyethyl (meth) acrylate, 2-hydroxypropyl (meth) acrylate, 2-hydroxybutyl (meth) acrylate, phenoxyhydroxypropyl (meth) acrylate, trimethylolpropane di (meth) acrylate, dipropylene glycol mono (meth) acrylate and the like.

Also, as an example of the polyalcohol having two or more hydroxyl groups in one molecule, neopentyl glycol, ethylene glycol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 1,10-decanediol, propylene glycol, diethylene glycol, dipropylene glycol, trimethylene glycol, hydrogenated bisphenol A, bisphenol A ethylene oxide adduct, bisphenol A propylene oxide adduct and the like can be used by itself or by the combination of two or more thereof. Also, as an example of the polyester polyols having two or more hydroxyl groups in one molecule, saturated polyester polyol having a molecular weight of 1000 to 2000 obtained from the dehydration condensation reaction of a polyalcohol such as neopentyl glycol, ethylene glycol, propylene glycol, diethylene glycol, dipropylene glycol, trimethylene glycol, hydrogenated bisphenol A, bisphenol A ethylene oxide adduct, bisphenol A propylene oxide adduct and the like with a polybasic acid such as adipic acid, (anhydride) phthalic acid, isophthalic acid, terephthalic acid, trimellitic acid and the like can be used by itself or by the combination of two or more thereof. Also, as an example of the polyether polyol having two or more hydroxyl groups in one molecule, polyethylene glycol or polypropylene glycols having a molecular weight of 300 to 2000 obtained by ring-opening reaction of ethylene oxide or propylene oxide, or polycaprolactone etc., obtained by ring-opening reaction of caprolactone can be used by itself or by the combination of two or more thereof.

As an example of the isocyanate compound having two or more isocyanate groups in one molecule, an aromatic and/or an aliphatic isocyanate compound can be used. For example, mention may be made of tolylene diisocyanate, diphenylmethane diisocyanate, hydrogenated diphenylmethane diisocyanate, 1,6-hexamethylene diisocyanate, isophorone diisocyanate, xylylene diisocyanate, hydrogenated xylylene diisocyanate, trifunctional isocyanate in which bifunctional isocyanate compounds have trimer isocyanurate rings, and a commercially available isocyanate prepolymers modified with polyol etc. These can be used by itself or by the combination of two or more thereof.

<A Method of Manufacturing a Crystalline Polyester (Meth) Acrylate>

Further, as an example of the polyester (meth) acrylate in the present invention, for example, mention may be made of polyester acrylate or a polyester methacrylate having double bonds of acrylate or methacrylate at the molecular terminal obtained by an esterification of polyester polyol with acrylic acid or methacrylic acid, or a reaction of acid-terminated polyester with acrylate or methacrylate having a glycidyl group. In the production of polyester (meth) acrylate, it is possible to obtain a polyester (meth) acrylate which has crystallinity, by appropriately selecting a combination of polyester polyol and acrylic acid or methacrylic acid, or a combination of acid-terminated polyester and acrylate or methacrylate having a glycidyl group. It may be a polyester acrylate resin or a polyester methacrylate resin in which polyester acrylate or polyester methacrylate is blended with a radical polymerizable compound such as styrene or diethylene glycol dimethacrylate. These may be used by itself or by the combination of two or more thereof. By appropriately adjusting the constituent components of these compounds, they can be given the property of being solid at 23° C. and imparting fluidity by heating.

<A Method of Manufacturing Crystalline Polyether (Meth) Acrylate>

The polyether (meth) acrylate in the present invention, for example, can be polyether acrylate or a polyether methacrylate having double bonds of acrylate or methacrylate at the molecular terminal obtained by an esterification of polyether polyol with acrylic acid or methacrylic acid, or a reaction of acid-terminated polyether with acrylate or methacrylate having a glycidyl group. In the production of polyether (meth) acrylate, it is possible to obtain a polyether (meth) acrylate which has crystallinity, by appropriately selecting a combination of polyether polyol and acrylic acid or methacrylic acid, or a combination of acid-terminated polyether and acrylate or methacrylate having a glycidyl group. It may be polyether acrylate resin or polyether methacrylate resin obtained by dissolving polyether acrylate or polyether methacrylate to a radical compound such as styrene, diethylene glycol dimethacrylate and the like. These may be used by itself or by the combination of two or more thereof. By appropriately adjusting the constituent components of these compounds, they can be given the property of being solid at 23° C. and imparting fluidity by heating.

As an example of a preferred embodiment of the crystalline radical polymerizable compound A of the present invention, it can include one or more selected from ethoxylated isocyanuric acid triacrylate (melting point: about 50° C.), polyethylene glycol di (meth) acrylate (melting point: 35 to 53° C.), methoxypolyethylene glycol (meth) acrylate (melting point: 33 to 40° C.), behenyl acrylate (melting point: 46° C.), tetramethyl piperidinyl methacrylate (melting point: 56 to 60° C.), trimethallyl isocyanurate (melting point: 83 to 87° C.), diacetone acrylamide (melting point: about 56° C.), itaconic acid dimethyl ester (melting point: 36° C.), vinyl stearate (melting point: 36° C.), N-vinylcarbazole (melting point: 67° C.), N-methylol acrylamide (melting point: 71 to 75° C.), acrylamide (melting point: 84° C.), tolylene allyl carbamate (melting point: 85 to 110° C.), maleimide (melting point: 93° C.) and acenaphthylene (melting point: 95° C.). When these crystalline radical polymerizable compounds A are used, the handleability can be improved.

A radical polymerizable compound that is liquid at room temperature can be blended as a part of the crystalline radical polymerizable composition in the present invention as long as the object of the present invention is not impaired. For example, mention may be made of styrene monomers having a vinyl group, vinyl aromatic compounds such as α-methylstyrene, vinyl toluene, α-chlorostyrene and the like; vinyl esters such as vinyl acetate, vinyl propionate, vinyl lactate, vinyl butyrate, veova monomer (manufactured by Shell Chemical Co., Ltd.), etc.; (meth) acrylic esters such as methyl acrylate, ethyl acrylate, n-butyl acrylate, methyl methacrylate, ethyl methacrylate, n-butyl methacrylate and the like.

Further, a radical polymerizable compound having bifunctionals or more of the radical polymerizable groups such as triallyl cyanurate, diethylene glycol dimethacrylate, diallyl tetrabromophthalate, phenoxyethyl acrylate, 2-hydroxyethyl acrylate, 1,6-hexanediol diacrylate, diallyl phthalate, triallyl isocyanurate having allyl group and the like can be used. These radical polymerizable compounds may be used alone or in combination of two or more.

Further, as the radical polymerizable compound in the present invention, for example, diallyl phthalate prepolymer, TAIC™ prepolymer (manufactured by Shinryo Corporation), epoxy prepolymer, urethane prepolymer, acrylate prepolymer may be used. These radical polymerizable compound may be used by itself or in combination of two or more.

In the crystalline radical polymerizable composition for fixing a magnet of the rotating electric machine rotor core of the present invention, an inorganic filler B can be blended. As the inorganic filler B, for example, mention may be made of calcium carbonate, magnesium carbonate, barium carbonate, calcium hydroxide, aluminum hydroxide, magnesium hydroxide, magnesium oxide, alumina, silica, zinc oxide, mica, talc, aluminum nitride and boron nitride. Among them, silica is preferable, and amorphous spherical silica is more preferable, from the viewpoint of the mechanical strength of the molded product of the crystalline radical polymerizable composition of the present invention. These may be used by itself or in combination of two or more.

In the crystalline radical polymerizable composition for fixing a magnet of the rotating electric machine rotor core of the present invention, various additives and a silane coupling agent C can be blended. The silane coupling agent C has an effect of improving the adhesion between the inorganic filler B and the reinforcing material and other components described later. As the silane coupling agent, for example, epoxysilane-based, aminosilane-based, cationicsilane-based, vinylsilane-based, acrylicsilane-based, mercaptosilane-based, and composite systems thereof and the like can be used. Among them, an acrylic silane coupling agent is preferable from the viewpoint of improving the strength of the cured product of the crystalline radical polymerizable composition of the present invention.

In the crystalline radical polymerizable composition for fixing a magnet of the rotating electric machine rotor core of the present invention, various additives, for example, (meth) acrylate compounds or coupling agents other than silane coupling agents having an effect of improving the adhesion between an inorganic filler or a reinforcing material and other components described later, can be blended.

The (meth) acrylate compound having a polar group is not particularly limited, and examples thereof may include (meth) acrylate compounds in which a substituent group containing an atom other than carbon and hydrogen is ester-linked. As examples of the substituent group, mention may be made of a hydroxyl group and epoxy groups, glycidyl ether group, tetrahydrofurfuryl group, isocyanate group, carboxyl group, alkoxysilyl group, phosphoric acid ester group, lactone group, oxetane group, tetrahydropyranyl group, amino group and the like. The coupling agent is not particularly limited, and for example, a silane series coupling agent or a titanate series coupling agent and the like can be used.

In the crystalline radical polymerizable composition for fixing a magnet of the rotating electric machine rotor core of the present invention, various adhesion imparting agents that improve the adhesion to a resin substrate or a metal can be blended.

The adhesion-imparting agent for improving the adhesion to a resin substrate or a metal is not particularly limited. For example, mention may be made of a rosin-based resin, a terpene-based resin, an alkylphenol resin, a xylene resin, a benzotriazole-based resin, a triazine-based resin, a phosphoric acid ester-based compound, an alcohol-based compound, and a coupling agent.

In the crystalline radical polymerizable composition for fixing a magnet of the rotating electric machine rotor core of the present invention, as the radical polymerization initiator D, a heat-decomposable organic peroxide usually used for an unsaturated polyester resin composition or a radical polymerizable composition can be used.

As organic peroxides, mention may be made of t-butylperoxy-2-ethylhexyl monocarbonate, 1,1-di (t-hexylperoxy) cyclohexane, 1,1-di (t-butylperoxy)-3,3,5-trimethylcyclohexane, t-butylperoxy octoate, benzoyl peroxide, methyl ethyl ketone peroxide, acetylacetone peroxide, t-butylperoxybenzoate, dicumyl peroxide and the like. These may be used by itself or in combination of two or more.

Among them, from a viewpoint of molding conditions and stability of storage, the use of organic peroxide wherein the 10 hours half-life temperature is 100° C. or higher, is preferable, and specifically dicumyl peroxide can be preferably used. When a peroxide having a low 10 hours half-life temperature is used, since the plasticization temperature and the curing temperature are close to each other when plasticizing the crystalline radical polymerizable composition in the cylinder in the injection molding method, there is a possibility that the curing reaction will partially proceed in the cylinder and the injection stability will be poor.

In the crystalline radical polymerizable composition for fixing a magnet of the rotating electric machine rotor core of the present invention, a polymerization inhibitor can be blended. As a polymerization inhibitor, mention may be made of quinones such as parabenzoquinone etc., a phenolic series compound such as hydroquinone, monomethyl ether hydroquinone, toluhydroquinone, di-t-4-methylphenol, monomethyl ether hydroquinone, t-buthyl catechol, pyrogallol, 2,6-di-t-butyl-cresol, 2,2-methylene-bis-(4-methyl-6-t-butyl phenol), 1,1,3-tris-(2-methyl-4-hydroxyl-5-t-butyl phenyl) butane etc., piperidin-1-oxyls such as 4-hydroxy-2,2,6,6-tetramethylpiperidine 1-oxyl, 4-oxo-2,2,6,6-tetramethylpiperidine-1-oxyl, 4-methoxy-2,2,6,6-tetramethylpiperidine-1-oxyl, 4-carboxy-2,2,6,6-tetramethylpiperidine-1-oxyl, 2,2,6,6-tetramethylpiperidine-1-oxyl etc., and phenothiazine. By using these, thickening in the middle of filling at the time of molding can be suppressed, and a crystalline radical polymerizable composition having a low melt viscosity can be obtained. These may be used by itself or in combination of two or more.

In the crystalline radical polymerizable composition for fixing a magnet of the rotating electric rotor core of the present invention, a reinforcing material can be blended. By using a reinforcing material, it may be possible to obtain a cured product having even better strength characteristics and dimensional stability.

As a reinforcing material used in the present invention, glass fibers generally used for fiber reinforced plastics such as BMC (bulk molding compound) and SMC (sheet molding compound) etc., can be used, but material is limited to glass fibers, and other materials can also be used.

As glass fiber, mention may be made of E glass (alkali-free glass for electricity), C glass (alkali-containing glass for chemistry), A glass (glass for acid resistance), S glass (high-strength glass) which uses silica glass and borosilicate glass as raw materials, and those made of long fibers (roving), short fibers (chopped strands) and milled fibers can be used. Furthermore, these glass fibers after surface treatment can also be used.

Further, in the crystalline radical polymerizable composition for fixing magnets of the rotating electric machine rotor core of the present invention, other inorganic fillers can be appropriately blended as long as the fluidity of the composition and the characteristics when used as a fixing material are not impaired.

As these type of other inorganic filler, mention may be made of an empty particle such as an oxide or hydrate thereof, an inorganic bubble particle, a silica balloon and the like.

In the crystalline radical polymerizable composition for fixing a magnet of the rotating electric machine rotor core of the present invention, the lubricant E can be used. As lubricants, mention may be made of waxes such as fatty acid type, fatty acid metal salt type, mineral type etc., which is generally used as a mold release agent for a thermosetting resin, in particular, it is possible to preferably use those of fatty acid type, fatty acid metal salt type and waxes which is superior for a heat discoloration resistance.

As these lubricants, specifically mention may be made of stearic acid, zinc stearate, aluminum stearate, calcium stearate and paraffin wax and the like. These lubricants may be used by itself or by the combination of two or more thereof.

In the present invention, other than these components, according to need, it is possible to accordingly formulate a curing catalyst, a polymerization inhibitor, a colorant, a thickener, a wetting dispersant, a surface conditioner, a viscosity reducing agent, a flow modifier, other organic series additives, inorganic series additives and the like can be appropriately blended, in order to control a curing condition of the crystalline radical polymerizable composition of the present invention.

<A Method of Producing the Crystalline Radical Polymerizable Composition>

The crystalline radical polymerizable composition for fixing magnets of the rotating electric machine rotor core of the present invention can be manufactured by formulating each components to mix it adequately and uniformly by using a mixer, a blender and after that, to control and granulate by using a mixer, an extruder capable of applying heat and pressure.

EXAMPLE

As mentioned below, an embodiment of the present invention will be concretely explained in more detail with reference to Examples, but the invention is not intended to be interpreted as being limited to Examples.

<Examples of Manufacturing the Crystalline Radical Polymerizable Composition for Fixing Magnets of Rotating Electric Machine Rotor Core>

Examples 1 to 4 and Comparative Example 1

The crystalline radical polymerizable compositions of Examples 1 to 4 which are shown in Table 2 and non-crystalline (amorphous) radical polymerizable composition of Comparative example 1 which is shown in Table 3, were formulated with the formulation amounts described in the following Tables 2 and 3, and prepared uniformly using a neader capable of heating, pressuring and cooling and after that, the prepared mixture was fed into the extruder and hot cut to form a granular material. Some of the granular material and bulk radical polymerizable composition were powdered using a grinder.

The following ingredients were used as compounding ingredients.

(1) A Radical Polymerizable Compound

1. A crystalline radical polymerizable compound 1: Urethane Methacrylate (2-hydroxyethyl methacrylate adduct of 1,6-hexamethylene diisocyanate)

2. A crystalline radical polymerizable compound 2: Ethoxylated isocyanuric acid triacrylate (A-9300, manufactured by Shin-Nakamura Chemical Co., Ltd.)
3. An amorphous radical polymerizable compound 3: Bisphenol A type epoxy acrylate (Acrylic acid adduct of bisphenol A type epoxy, epoxy equivalent 450 g/eq.)

(2) An Inorganic Filler

1. An inorganic filler 1: Fused silica (manufactured by Denka Co., Ltd., average particle size 24 μm)
2. An inorganic filler 2: Magnesium oxide (manufactured by Ube Material Industries Ltd., average particle size 70 μm)

(3) An Additive Agent

1. A silane coupling agent: Methacrylic based silane (KBM-503 manufactured by Shin-Etsu Chemical Co., Ltd.)
2. A radical polymerization initiator: Dicumyl Peroxide (Park Mill D, manufactured by NOF Corporation)
3. A lubricant: Zinc stearate (GF-200, manufactured by NOF Corporation)
4. A polymerization inhibitor: Parabenzoquinone (PBQ, manufactured by Seiko Chemical Co., Ltd.)
5. A colorant: Carbon black (CB40, manufactured by Mitsubishi Chemical Corporation)

<Characteristics of Radical Polymerizable Compound>

The characteristics of the radical polymerizable compound are shown in Table 1.

TABLE 1

| | | Melting point [° C.] | Weight average molecular weight |
|---|---|---|---|
| A crystalline radical polymerizable compound 1 | Urethane Methacrylate | 77 | 800 |
| A crystalline radical polymerizable compound 2 | Ethoxylated isocyanuric acid triacrylate | 55 | 600 |
| An amorphous radical polymerizable compound 3 | Bisphenol A type epoxy acrylate | — | 3000 |

TABLE 2

| | | Unit | Example 1 | Example 2 | Example 3 | Example 4 |
|---|---|---|---|---|---|---|
| A crystalline radical polymerizable compound 1 | Urethane Methacrylate | % by mass | 50 | 50 | 50 | 50 |
| A crystalline radical polymerizable compound 2 | Ethoxylated isocyanuric acid triacrylate | % by mass | 50 | 50 | | 50 |
| An amorphous radical polymerizable compound 3 | Bisphenol A type epoxy acrylate | % by mass | | | 50 | |
| An inorganic filler 1 | Fused silica | % by mass | 700 | 500 | | 900 |
| An inorganic filler 2 | Magnesium oxide | % by mass | | 200 | 400 | |
| A silane coupling agent | Methacrylic based silane | % by mass | 3 | 3 | 3 | 3 |
| A radical polymerization initiator | Dicumyl Peroxide | % by mass | 1 | 1 | 1 | 1 |
| A lubricant | Zinc stearate | % by mass | 10 | 10 | 10 | 10 |
| A polymerization inhibitor | Parabenzoquinone | % by mass | 0.1 | 0.1 | 0.1 | 0.1 |
| A colorant | Carbon black | % by mass | 0.2 | 0.2 | 0.2 | 0.2 |
| Total | | | 814.3 | 814.3 | 514.3 | 1014.3 |
| Hardness | | | 40 | 53 | 35 | 70 |
| Melt viscosity A | 1/s | Pa · s | 940 | 3,000 | 600 | 9,000 |
| Melt viscosity B | 250/s | Pa · s | 45 | 40 | 20 | 130 |
| Thixotropy | A/B | | 21 | 75 | 30 | 69 |

TABLE 3

| | | Unit | Comparative example 1 |
|---|---|---|---|
| A crystalline radical polymerizable compound 1 | Urethane Methacrylate | % by mass | |
| A crystalline radical polymerizable compound 2 | Ethoxylated isocyanuric acid triacrylate | % by mass | |
| An amorphous radical polymerizable compound 3 | Bisphenol A type epoxy acrylate | % by mass | 100 |
| An inorganic filler 1 | Fused silica | % by mass | |
| An inorganic filler 2 | Magnesium oxide | % by mass | 100 |
| A silane coupling agent | Methacrylic based silane | % by mass | 3 |
| A radical polymerization initiator | Dicumyl Peroxide | % by mass | 1 |
| A lubricant | Zinc stearate | % by mass | 10 |
| A polymerization inhibitor | Parabenzoquinone | % by mass | 0.1 |
| A colorant | Carbon black | % by mass | 0.2 |
| Total | | | 214.3 |
| Hardness | | | 15 |
| Melt viscosity A | 1/s | Pa · s | 20 |
| Melt viscosity B | 250/S | Pa · s | 18 |
| Thixotropy | A/B | | 1 |

<A Characteristic of Chemical Compound, a Characteristic of Composition and a Method of Evaluating Physical Property>

(1) Melting Point 10 mg of the radically polymerizable compound shown in Table 1 to be measured was placed in an aluminum pan and the lid was pressed to seal it. Then its DSC curve was measured at a temperature from −60° C. up to 200° C., with rising rate of 10° C./min up to 200° C., using a differential scanning calorimeter "DSC 6220" (manufactured by Seiko Instruments Inc.). The endothermic peak of the obtained curve was taken as the melting point. The results are shown in Table 1. The glass transition point was determined according to JIS K7121 and used as the intermediate point glass transition temperature.

(2) Weight Average Molecular Weight

The radical polymerizable compound shown in Table 1 was dissolved in tetrahydrofuran (THF) at 1.0% by mass, then measured its weight average molecular weight by polystyrene conversion using GPC (gel permeation chromatography). The measurement conditions are shown below. The results are shown in Table 1.

Equipment: Shodex GPC-101 produced by Showa Denko K.K.

Column: KF-802, 803, 804, 805 produced by Showa Denko K.K.

Solvent, carrier liquid: THF

Flow rate: 1.0 ml/min

Sample concentration: 1.0% by mass

Temperature: 40° C.

Sample injection volume: 200 μl

Detector: Differential Refractive Index Detector (3) Hardness

The measurement method was based on JIS K 7215. The hardness of the crystalline radical polymerizable composition of Examples 1 to 4 shown in Table 2 and the hardness of the non-crystalline (amorphous) radical polymerizable composition of Comparative Example 1 shown in Table 3 were measured by a durometer (WR-105D produced by Nishi Tokyo Seimitsu Co., Ltd.). The radical polymerizable composition whose temperature is controlled at 90° C. was formed into a flat plate of about 100 mm×100 mm×10 mm and cooled and solidified in a thermostatic chamber at 23° C. The radical polymerizable composition before curing whose temperature is controlled at 23° C., was placed on a horizontal hard table. The pressure reference surface of the durometer was pressed against the surface of the radical polymerizable composition as quickly as possible without impact while keeping parallel to the surface of the radical polymerizable composition and the pressure reference surface to adhere the pressure reference surface to the radical polymerizable composition sufficiently. The maximum indicated value of the pointer of the pointing device was read immediately within one second. The results are shown in Tables 2 and 3. 20 or more of that value is evaluated as a solid. The target hardness was excellent at 30 or more and acceptable at 20 or more. However, even if the above-mentioned strict standard is not fulfilled, since there is possibility that the conditions of less than 20 may be met according to a desired application and a desired quality etc., so it may be considered as a guideline.

(4) Melt Viscosity at Shear Velocity of 1/s (A)

The melt viscosity of the crystalline radical polymerizable compositions of Examples 1 to 4 shown in Table 2 and the melt viscosity of the amorphous radical polymerizable composition of Comparative Example 1 shown in Table 3 were measured by using an enhanced (high-grade) flow tester (CFT-100EX, manufactured by Shimadzu Corporation). A radical polymerizable composition was placed in a cylinder sample insertion hole heated to 90° C., with a die having a diameter of 2 mm and a length of 10 mm, and after preheating for 240 seconds, the pressure was changed by 3 levels or more to change the relationship between the shear velocity and the melt viscosity were obtained. It was measured at pressures of 0.2, 0.3 and 0.4 MPa. When the measurement result was not obtained, the measurement was carried out at a pressure of 1, 2, 3 MPa or 3 MPa or more, and the melt viscosity at a shear velocity (shear rate) of 1/s was determined by the extrapolation method. The results are shown in Tables 2 and 3. The target melt viscosity at a shear rate of 1/s was 500 Pa·s or more, 700 Pa·s or more was excellent, and 500 Pa·s or more was acceptable.

(5) Melt Viscosity (B) at a Shear Velocity of 250/s

The melt viscosity of the crystalline radical polymerizable compositions of Examples 1 to 4 shown in Table 2 and the melt viscosity of the amorphous radical polymerizable composition of Comparative Example 1 shown in Table 3 were measured by using an enhanced flow tester (CFT-100EX, manufactured by Shimadzu Corporation). A radical polymerizable composition was placed in a cylinder sample insertion hole heated to 90° C., with a die having a diameter of 2 mm and a length of 10 mm, and after preheating for 240 seconds, the pressure was changed by 3 levels or more to change the relationship between the shear velocity and the melt viscosity were obtained. It was measured at pressures of 0.2, 0.3 and 0.4 MPa. When the measurement result was not obtained, the measurement was carried out at a pressure of 1, 2, 3 MPa or 3 MPa or more, and the melt viscosity at a shear velocity (shear rate) of 250/s was determined by the interpolation method. The results are shown in Tables 2 and 3. The target melt viscosity at a shear rate of 250/s was 100 Pa·s or less, 80 Pa·s or less was excellent, and 100 Pa·s or less was acceptable. However, even if the above-mentioned strict standard is not fulfilled, since there is possibility that the conditions other than 100 may be met according to a desired application and a desired quality etc., so it may be considered as a guideline.

(6) Thixotropy

With respect to the crystalline radical polymerizable compositions of Examples 1 to 4 shown in Table 2 and the amorphous radical polymerizable composition of Comparative Example 1 shown in Table 3, the melt viscosity at a shear rate of 1/s by the enhanced flow tester was defined as A, and the melt viscosity at a shear rate of 250/s by the enhanced flow tester was defined as B. The quotient of melt viscosity A/B was defined as thixotropy property. The results are shown in Tables 2 and 3. The target thixotropy property was in the range of 10 to 100, 20 to 90 was excellent, and 10 to 100 was acceptable. However, even if the above strict-mentioned standard is not fulfilled, since there is possibility that the conditions having a range other than the range of 10 to 100 may be met according to a desired application and a desired quality etc., so it may be considered as a guideline.

<Evaluation Result>

As shown in Tables 2 and 3, the crystalline radical polymerizable composition for fixing a rotating electric machine rotor core magnet in the present invention is in a solid state at room temperature, so that it is easy to handle near room temperature. Even if the magnet is inserted into the magnet insertion hole and then the crystalline radically polymerizable composition in a molten state is injected, it does not penetrate into the gaps between the laminated electromagnetic steel sheets constituting the rotor core and it does not drip during the transport process to the curing step. Therefore, it turned out to be excellent in the productivity of the rotor core. It was found that the crystalline radical polymerizable composition for fixing electrical and electronic components in the present invention shows excellent results as a whole.

Comparative Example 1 is an amorphous radical polymerizable composition obtained by changing the crystalline radical polymerizable compound of Example 1 into an amorphous radical polymerizable compound and reducing the amount of the inorganic filler compounded. Comparative Example 1 was a solid and had a low melt viscosity at 250/s, but the melt viscosity at 1/s was also low, resulting in poor retention of the polymerizable composition.

As described above, it has been found that the crystalline radical polymerizable composition of the present invention is excellent in flow characteristics and handleability.

Example 8

Next, using the crystalline radical polymerizable composition for fixing the magnet of the rotating electric machine rotor core of the present invention, a rotating electric machine rotor core in which the magnet was actually fixed was manufactured.

(Rotor Core Structure)

First, the structure of the rotor core 4 of the present embodiment will be described with reference to FIG. 1.

As shown in FIG. 1, the rotating electric machine 100 includes a rotor 1 (rotor core 4) and a stator 2. The rotor 1 and the stator 2 are each formed in an annular shape. The rotor 1 is arranged so as to face the inside (R1 side) of the stator 2 in the radial direction (R direction). That is, the rotating electric machine 100 is configured as an inner rotor type rotating electric machine. Further, the shaft 3 is arranged inside (R1 side) in the radial direction (R direction) of the rotor 1. The shaft 3 is connected to an engine or an axle via a rotational force transmitting member such as a gear. For example, the rotating electric machine 100 is configured as a motor, a generator, or a motor/generator, and is configured to be mounted on a vehicle.

The stator 2 includes a stator core 2*a* and a coil 2*b* arranged on the stator core 2*a*. The stator core 2*a* is configured such that, for example, a plurality of electromagnetic steel sheets (silicon steel sheets) are laminated in the axial direction (Z direction) so that magnetic flux can pass through the stator core 2*a*. The coil 2*b* is connected to an external power supply unit and is configured to supply electric power (for example, three-phase alternating current electric power). The coil 2*b* is configured to generate a magnetic field by being supplied with electric power. Further, the rotor 1 and the shaft 3 are configured to rotate with respect to the stator 2 as the engine or the like is driven, even when electric power is not supplied to the coil 2*b*. Although only a part of the coil 2*b* is shown in FIG. 1, the coil 2*b* is arranged over the entire circumference of the stator core 2*a*.

The rotor core 4 includes a laminated core 4*d* (see FIG. 2) and a permanent magnet 5. In the laminated core 4*d*, a plurality of electromagnetic steel sheets 4*a* (see FIG. 2) are laminated in a direction (Z direction) along the rotation axis line A of the rotor core 4 (laminated steel sheets), and the electromagnetic steel sheets 4*a* are laminated in a laminated direction (Z direction), and the laminated core 4*d* has a magnet accommodating portion 10 extending in the laminated direction (Z direction) of the electromagnetic steel sheets 4*a*. The permanent magnet 5 has a rectangular cross section orthogonal to the axial direction (Z direction) of the laminated core 4*d* (rotor core 4). For example, the permanent magnet 5 is configured so that the magnetization direction (magnetism direction) is the lateral direction. The permanent magnet 5 is inserted into the magnet accommodating portion 10 of the laminated core 4*d*. A plurality of magnet accommodating portions 10 (32 pieces in the rotor core 4) are provided in the laminated core 4*d*. That is, the rotating electric machine 100 is configured as an embedded permanent magnet type motor (IPM motor: Interior Permanent Magnet Motor). The magnet accommodating portion 10 is arranged on the portion of the outer side (R2 side) in the radial direction (R direction) in the laminated core 4*d* (rotor core 4). Further, the two magnet accommodating portions 10 adjacent to each other are arranged in a V shape. Moreover, the arrangement of the magnet accommodating portion 10 is not limited to this.

The rotor core 4 includes a resin material 6 (see FIG. 2) filled in the magnet accommodating portion 10. The composition of the present invention can be used as the resin material 6. The resin material 6 is provided so as to fix the permanent magnet 5 arranged in the magnet accommodating portion 10. The resin material 6 is composed of a material (thermosetting resin) that melts at the first temperature T1 and cures at a second temperature T2 higher than the first temperature T1. Specifically, the resin material 6 is solid (flake-like, pellet-like, powder-like, etc.) at a room temperature lower than the first temperature T1, and is heated from the room temperature and melts when the temperature of the resin material 6 becomes the first temperature T1 or higher. And the resin material 6 is configured to maintain a molten state (do not cure) in a state of being equal to or higher than the first temperature T1 and lower than the second temperature T2. And the resin material 6 is configured to be cured by being heated to a temperature equal to or higher than the second temperature T2. Moreover, in FIG. 1, the resin material 6 is not shown for the sake of simplicity.

As shown in FIG. 2, the jig 20 includes an upper plate 21, a pressing spring 22, a pressing plate 23, a lower plate 24, a heat insulating member 25, a positioning plate 26, and a clamp member 27. Moreover, the upper plate 21, the pressing plate 23, the lower plate 24, and the positioning plate 26 are each made of SUS (stainless steel). Further, as shown in FIG. 2, the upper plate 21 has a through hole 21*a* in the central portion and is formed in an annular shape. Further, the upper plate 21 includes a plurality of resin injection holes 21*b*. The resin injection hole 21*b* is provided so that the mold nozzle of the resin injection device 103 can be inserted. Moreover, the resin injection holes 21*b* are provided so as to overlap each of the plurality of magnet accommodating portions 10 (32 pieces in the rotor core 4).

Moreover, the induction heating coil (not shown) of the heating device 102 for preheating (see FIG. 3), which will be described later, is inserted inside (R1 side) in the radial direction (R direction) of the laminated core 4*d* via each of the through hole 21*a* of the upper plate 21 and the through hole 23*a* of the pressing plate 23. In addition, the induction heating coil (not shown) provided in the heating device 104 for curing (see FIG. 3) is also inserted inside (R1 side) in the radial direction (R direction) of the laminated core 4*d* via the through hole 21*a* of the upper plate 21 and the through hole 23*a* of the pressing plate 23.

The pressing spring 22 is provided between the upper plate 21 and the pressing plate 23. Further, a plurality of pressing springs 22 are provided at equal angular intervals along the circumferential direction (E direction) of the laminated core 4*d* when viewed from the direction (Z direction) along the rotation axis A. Moreover, the jig 20 is provided with four pressing springs 22. Each of the plurality of pressing springs 22 is provided at a position where the laminated core 4*d* is arranged on the jig 20 and overlaps with the laminated core 4*d* when viewed from above (Z1 side).

Further, the pressing plate 23 has a through hole 23*a* in the central portion when viewed from the Z direction, and is formed in an annular shape. Further, the pressing plate 23 includes a plurality of resin injection holes 23*b*. The plurality of resin injection holes 23*b* are provided at positions that overlap with the plurality of resin injection holes 21*b* of the upper plate 21 when viewed from above (Z1 side).

Further, the laminated core 4*d* is arranged (placed) on the lower plate 24. That is, the lower plate 24 is in contact with the lower end surface 4*c* of the laminated core 4*d*. The lower plate 24 has a through hole 24*a* in the central portion and is formed in an annular shape. Further, the lower plate 24 includes a plurality of notches 24*b* (three in the jig 20).

Further, the heat insulating member 25 is provided so as to be sandwiched between the lower plate 24 and the positioning plate 26. The heat insulating member 25 has a through hole 25*a* in the central portion and is formed in an annular shape. Further, the heat insulating member 25 is made of resin. The clamp members 27 are provided at substantially equal angle intervals (that is, 90 degree intervals) along the circumferential direction (C direction) of the laminated core 4*d* when viewed from the direction (Z direction) along the rotation axis A.

(Rotor Core Manufacturing System)

Next, with reference to FIG. 3, the manufacturing system 200 of the rotor core 4 for manufacturing the rotor core 4 of the present embodiment will be described.

As shown in FIG. 3, the manufacturing system 200 of the rotor core 4 includes an assembly device 101, a heating device 102 for preheating, a resin injection device 103, and a heating device 104 for curing. Further, the manufacturing system 200 of the rotor core 4 includes a transport conveyor 105 for transporting the laminated core 4*d*. Moreover, the assembly device 101, the heating device 102 for preheating, the resin injection device 103, and the heating device 104 for curing are separate devices from each other.

The assembly device 101 is configured to arrange (assemble) the laminated core 4*d* on the jig 20. Specifically, the assembly device 101 is configured to arrange (insert) the permanent magnet 5 in the magnet accommodating portion 10 while arranging the laminated core 4*d* in the jig 20.

The heating device 102 for preheating is configured to preheat by heating the laminated core 4*d*. Specifically, the heating device 102 for preheating is configured to preheat the laminated core 4*d* in a state of being placed on the jig 20 by heating at a temperature higher than or equal to a first temperature T1 (for example, 50° C.) and lower than a second temperature T2 (for example, 120° C.). Moreover, the first temperature T1 is the temperature at which the resin material 6 melts (the temperature at which melting starts). Further the second temperature T2 is a temperature at which the resin material 6 is cured (heat-cured) (a temperature at which curing (heat curing) is started) and is higher than the first temperature T1.

The resin injection device 103 is configured to inject the resin material 6 into the magnet accommodating portion 10. Specifically, the resin injection device 103 is configured to inject the molten resin material 6 at a temperature T1 or higher into the magnet accommodating portion 10 in a state where the laminated core 4*d* is arranged in the jig 20 and in a state where the permanent magnet 5 is inserted in the magnet accommodating portion 10.

The heating device 104 for curing is configured to cure the resin material 6 in the magnet accommodating portion 10 by heating the laminated core 4*d*. Specifically, the heating device 104 for curing is configured to cure the resin material 6 in the magnet accommodating portion 10 by heating the laminated core 4*d* at a temperature equal to or higher than the second temperature T2 at which the resin material 6 is cured, in a state where the laminated core 4*d* is arranged in the jig 20 and in a state where the resin material 6 is injected into the magnet accommodating portion 10. Further, the manufacturing system 200 of the rotor core 4 includes a transport conveyor 105 that transports the laminated core 4*d*.

In this way, as a result of actually manufacturing the rotating electric machine rotor core in which the magnet is fixed by using the crystalline radical polymerizable composition for fixing a magnet of a rotating electric machine rotor core of the present invention, it has been found that the magnet can be fixed without, for example, deforming the rotating electric machine rotor core.

EXPLANATION OF CODE

2 stator
2*a* stator core
2*b* coil
3 shaft
4 rotor core
4*a* electromagnetic steel sheets
4*c* lower end surface
4*d* laminated core
5 permanent magnet
6 resin material
10 magnet accommodating portion
20 jig
21 upper plate
21*a* through hole
21*b* resin injection hole
22 pressing spring
23 pressing plate
23*a* through hole
23*b* resin injection hole
24 lower plate
24*a* through hole
24*b* notch
25 heat insulating member
25*a* through hole
26 positioning plate
27 clamp member
101 assembly device
102 heating device for preheating
103 resin injection device
104 heating device for curing
105 transport conveyor
200 manufacturing system
A rotation axis
C circumferential direction of laminated core 4*d*

The invention claimed is:

1. A method for fixing a magnet inserted in a magnet accommodating portion provided in a rotor core of a rotating electric machine formed of a laminated steel sheet and the laminated steel sheet, comprising a step of carrying out a fixation between the magnet and the laminated steel sheet using a crystalline radical polymerizable composition, wherein the crystalline radical polymerizable composition contains at least a crystalline radical polymerizable compound A, an inorganic filler B, a silane coupling agent C, and a radical polymerization initiator D, wherein the crystalline radical polymerizable compound A is solid at 23° C. and has the property capable of imparting fluidity by heating, wherein the inorganic filler B is contained in an amount of 50 to 90% by mass based on the total amount of the crystalline radical polymerizable composition, and the melt viscosity of the crystalline radical polymerizable composition measured by an enhanced flow tester is 500 Pa·s or more at 90° C. and a shear rate of 1/s, wherein the melt viscosity of the crystalline radical polymerizable composition measured by the enhanced flow tester is 100 Pa's or less at 90° C. and a shear rate of 250/s, and wherein the quotient (A)/(B) of the melt viscosity of the crystalline radical polymerizable composition measured by the enhanced flow tester is in the range of 10 to 100

(A) Melt viscosity at shear rate 1/s (B) Melt viscosity at a shear rate of 250/s.

2. A method for fixing a magnet of a rotating electric machine rotor core according to claim 1, characterized in that the inorganic filler B contains at least amorphous spherical silica.

3. A method for fixing a magnet of a rotating electric machine rotor core according to claim 2, characterized in that the content of the amorphous spherical silica is 50 to 100% by mass with respect to the inorganic filler B.

4. A method for fixing a magnet of a rotating electric machine rotor core according to claim 1, characterized in that the crystalline radical polymerizable composition contains a lubricant E.

5. A rotating electric machine rotor core, wherein a magnet is fixed by using the crystalline radical polymerizable composition for fixing magnet of a rotating electric machine rotor core, wherein the crystalline radical polymerizable composition contains at least a crystalline radical polymerizable compound A, an inorganic filler B, a silane coupling agent C, and a radical polymerization initiator D, wherein the crystalline radical polymerizable compound A is solid at 23° C. and has the property capable of imparting fluidity by heating, wherein the inorganic filler B is contained in an amount of 50 to 90% by mass based on the total amount of the crystalline radical polymerizable composition, and the melt viscosity of the crystalline radical polymerizable composition measured by an enhanced flow tester is 500 Pa·s or more at 90° C. and a shear rate of 1/s, wherein the melt viscosity of the crystalline radical polymerizable composition measured by the enhanced flow tester is 100 Pas or less at 90° C. and a shear rate of 250/s, and wherein the quotient (A)/(B) of the melt viscosity of the crystalline radical polymerizable composition measured by the enhanced flow tester is in the range of 10 to 100

(A) Melt viscosity at shear rate 1/s (B) Melt viscosity at a shear rate of 250/s.

6. A method of manufacturing a rotating electric machine rotor core, characterized by having a step of injecting a crystalline radical polymerizable composition having fluidity imparted by heating into a magnet accommodating portion provided in a rotating electric machine rotor core formed of a laminated steel plate sheet, wherein the crystalline radical polymerizable composition is the crystalline radical polymerizable composition for fixing a rotating electric rotor core magnet according to claim 1, and the injection is by an injection molding method, a transfer molding method, or an insert molding method by a casting method.

* * * * *